United States Patent
Yoon et al.

(10) Patent No.: US 6,218,050 B1
(45) Date of Patent: Apr. 17, 2001

(54) CABONACEOUS MATERIAL FOR NEGATIVE ELECTRODE OF LITHIUM SECONDARY BATTERY AND LITHIUM SECONDARY BATTERY USING SAME

(75) Inventors: Sang-young Yoon, Chungchongnam-do (KR); Ryoji Mishima, Youkihanashi; Toshiaki Tsuno, Kawasakisi, both of (JP)

(73) Assignee: Samsung Display Devices Co., Ltd. (KR)

( * ) Notice: Subject to any disclaimer, the term of this patent is extended or adjusted under 35 U.S.C. 154(b) by 0 days.

(21) Appl. No.: 09/273,062

(22) Filed: Mar. 19, 1999

(30) Foreign Application Priority Data

Mar. 20, 1998 (JP) .................................. 10-092700
Dec. 18, 1998 (JP) .................................. 10-360846

(51) Int. Cl.$^7$ .............................. H01M 4/58; C01B 31/00
(52) U.S. Cl. ................................ 429/231.8; 429/231.4; 423/414; 423/445 R; 423/460
(58) Field of Search .................... 429/231.4, 231.8; 423/414, 445 R, 460

(56) References Cited

U.S. PATENT DOCUMENTS

| | | | |
|---|---|---|---|
| 4,099,990 | * | 7/1978 | Brown et al. . |
| 4,151,154 | * | 4/1979 | Berger . |
| 4,411,494 | * | 10/1983 | Crossland et al. . |
| 5,571,638 | * | 11/1996 | Satoh et al. . |
| 5,595,838 | * | 1/1997 | Yamada et al. . |
| 5,776,610 | * | 7/1998 | Yamada et al. . |
| 5,776,637 | * | 7/1998 | Kashio et al. . |
| 5,817,281 | * | 10/1998 | Kho et al. . |
| 5,985,489 | * | 11/1999 | Ohsaki et al. . |
| 6,017,654 | * | 1/2000 | Kumta et al. . |

\* cited by examiner

*Primary Examiner*—Patrick Ryan
*Assistant Examiner*—Colleen P. Cooke
(74) *Attorney, Agent, or Firm*—Blakely Sokoloff & Taylor & Zafman

(57) ABSTRACT

Disclosed is carbonaceous material for a negative electrode of a lithium secondary battery and a lithium secondary battery made using the carbonaceous material. The carbonaceous material includes a silica film coated on a surface of carbon particles of the carbonaceous material, thereby minimizing both direct contact of the carbon particles with an organic electrolyte and cointercalation of the organic electrolyte and lithium ions within a structure of the carbon. The lithium secondary battery includes a negative electrode deposited with the carbonaceous material, a counterpart electrode made of lithium metal, electrolyte made of a propylene carbonate/ethylene carbonate solution containing 1 mol/l of $LiPF_8$, and a polypropylene separator.

3 Claims, 2 Drawing Sheets

CABONACEOUS MATERIAL FOR NEGATIVE ELECTRODE OF LITHIUM SECONDARY BATTERY AND LITHIUM SECONDARY BATTERY USING SAME

BACKGROUND OF THE INVENTION (a) Field of the Invention

The present invention relates to a negative electrode of a lithium secondary battery, and more particularly to carbonaceous material for a negative electrode of a lithium secondary battery, the carbonaceous material being improved such that application thereof to the lithium secondary battery decreases irreversible capacity of a first cycle and increases discharge capacity of the lithium secondary battery. The present invention also relates to a lithium secondary battery made using the carbonaceous material.

(b) Description of the Related Art

With the proliferation in the use of portable electronic devices in recent times, coupled with advancements enhancing performance and enabling increasingly smaller sizes and weights for these devices, research is being actively pursued to improve the energy density of secondary batteries. One such type of secondary battery having high energy density characteristics is the lithium secondary battery Lithium secondary batteries utilize material that is able to undergo lithium ion intercalation and deintercalation respectively for a negative electrode and a positive electrode, and are filled with organic electrolyte or polymer electrolyte, which enable movement of lithium ions inside the battery (i.e., back to the negative electrode in the form of an ionic current).

The lithium secondary battery utilizes lithium metal as a negative electrode, and positive electrode material differing in oxidation potential from the lithium metal as a lithium ion carrier. Electrical energy is generated in the lithium secondary battery by processes of oxidation and reduction which take place when lithium ions undergo intercalation and deintercalation in the negative electrode and the positive electrode, respectively. With the use of lithium metal as the negative electrode in the lithium secondary battery, a serious problem of dendrite forming on a surface of the lithium metal results during charging and discharging. This may cause a short circuit, or more seriously may lead to the explosion of the battery.

To prevent such problems, carbonaceous material is now widely used for the active material of the negative electrode in what is known as a lithium ion secondary battery. Carbonaceous material is able to alternatingly either receive or supply lithium ions while maintaining its structural integrity and electrical properties. In the lithium ion secondary battery, lithium ions undergo intercalation and deintercalation between carbon layers. By the use of carbonaceous material for the negative electrode active material rather than directly using lithium metal, the reaction between active lithium and electrolyte is suppressed, and a short circuit caused by dendrite forming on the surface of the lithium metal is prevented.

However, in the lithium ion secondary battery using carbonaceous material as the negative electrode active material, since lithium ions are intercalated between the carbon layers, a capacity per gram is reduced by the amount of carbon present. As a result, although it is desirable to use a carbon material which can intercalate and deintercalate a maximum amount of lithium ions, a theoretical capacity of even graphite, which develops the most between the layers, is only 372 mAh/g. Further, an irreversible capacity of about 10% occurs by either a reaction between a surface of the graphite and an organic electrolyte, or a reaction between the lithium ions and cointercalated electrolytic material.

To increase the capacity of the carbon negative electrode, there is proposed the use of disordered carbon (amorphous hard carbon) which can intercalate lithium at other areas in addition to between the carbon layers. In the carbonaceous material, since there are many sites where lithium can be inserted, it is possible for part of the lithium to exist as metal clusters such that capacity is greatly increased. However, irreversible capacity is also increased with the use of amorphous carbon.

SUMMARY OF THE INVENTION

It is an object of the present invention to provide carbonaceous material for a negative electrode of a lithium secondary battery the carbonaceous material being improved such that application of the carbonaceous material to the lithium secondary battery decreases irreversible capacity of a first cycle and increases discharge capacity of the lithium secondary battery. It is also an object of the present invention to provide a lithium secondary battery made using the carbonaceous material.

The carbonaceous material includes carbon particles and a silica film coated on a surface of carbon particles of the carbonaceous material, thereby minimizing both direct contact of the carbon particles with an organic electrolyte and cointercalation of the organic electrolyte and lithium ions within a structure of the carbon.

The lithium secondary battery includes a negative electrode prepared by using the carbonaceous material.

BRIEF DESCRIPTION OF THE DRAWINGS

Further objects and other advantages of the present invention will become apparent from the following description in conjunction with the attached drawings, in which.

DETAILED DESCRIPTION OF THE PRESENT INVENTION

Figure 1:
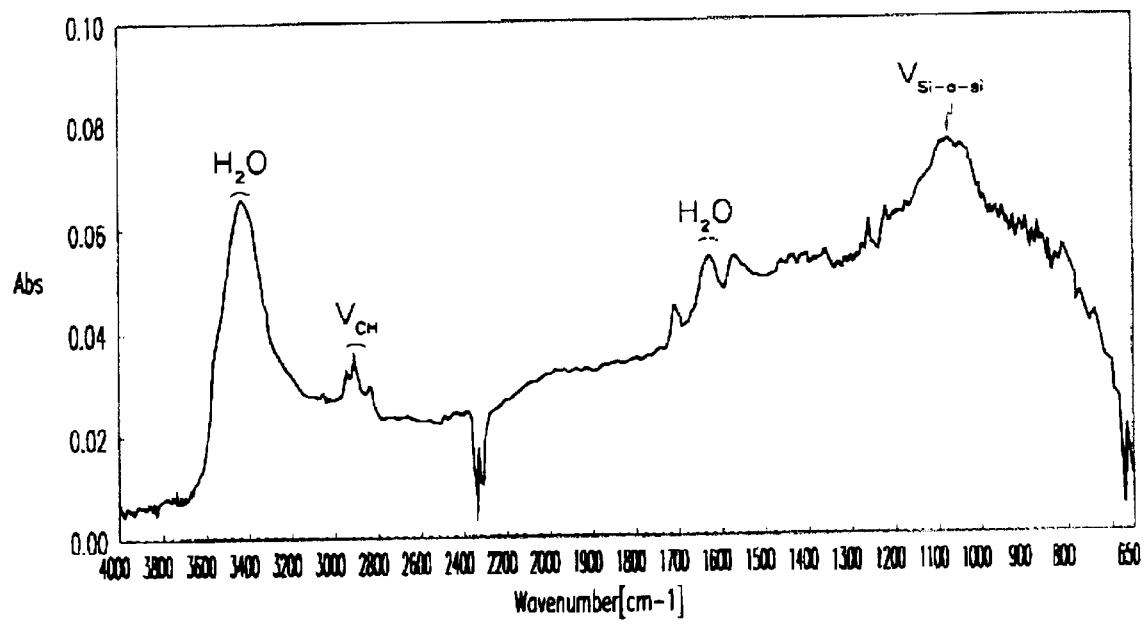
FIG. 1 is a graph of a FTIR spectrochemical analysis of Comparative Example 5.

The present invention provides carbonaceous material for a negative electrode of a lithium secondary battery. The carbonaceous material of the present invention was made out of research discovering that with a coating of a porous silica film, irreversible capacity of the lithium secondary battery is reduced and discharge capacity of the same is improved.

Although the generation of a large irreversible capacity of a first cycle is not fully understood, there are several theories as to the cause of such a phenomenon. This is evidence that the cause of irreversible capacity is complex. One such theory maintains that irreversible capacity is caused by the formation of lithium reaction material which does not participate in the battery reaction. This lithium reaction material is generated by a reaction between organic electrolyte and a surface of carbon. It can be shown that the surface of carbon is coated with $LiCO_3$, $LiF$ and other such lithium reaction materials during charging.

Another theory for the cause of irreversible capacity explains that, in the case where there is used a material which develops in a layer structure and maintains a crystalline structure such as graphite, the cointercalating of an organic electrolyte together with lithium ions between layers of this material is the source of this problem. That is, the intercalated lithium ions become stabilized between the layers of the material by cointercalation with the organic electrolyte.

Still another theory maintains that irreversible capacity is caused by the existence of H and OH functional groups in carbon. This is because a H/C ratio is large in disordered carbon and decreases as the carbon becomes ordered. Since lithium trapped in the H or OH functional group is related to efficiency, the carbon becomes ordered and the H/C ratio decreases by high temperature sintering. Lithium becomes irreversibly inserted in coupling areas of the carbon structure according to changes in the carbon structure, and this irreversibility of lithium reduces battery efficiency.

Regardless of the actual root source(s) of irreversible capacity, an effective way to prevent or minimize the problem is to coat the carbon surface with a thin crystalline film which allows for the passage of lithium ions while blocking the passage of an organic polymer such that the carbon surface does not directly come into contact with organic electrolyte. This prevents the cointercalation of lithium ions in the carbon structure which, in turn, prevents the generation of irreversible capacity.

Such a crystalline film is formed by performing an oxidation process after a silane process (a process using a silane coupling agent) on the surface of the carbon. Examples of the resulting film include a SiO porous film or a $SiO_2$ porous film. There are wet and dry silane processes. In the present invention, the crystalline film is obtained using both the wet silane process in which carbon particles are mixed and stirred in a silane coupling agent, and the dry silane process in which a silane coupling agent and the carbon particles are kneaded in a kneader.

The each component in the lithium secondary battery of the present invention will now be described.

Electrolyte

For electrolyte, there is used a lithium salt solution such as $LiPF_6$, $LiBF_4$, $LiClO_4$, $LiCF_3SO_4$, and $LiAsF_6$ dissolved in ethylene carbonate, propylene carbonate, dimethyl carbonate, dimethoxy carbonate, dimethoxy ethane, or tetrahydro furan, or dissolved in a mixture thereof. In the case where a solid electrolyte is applied in the battery of the present invention, there is used the organic solvent as a plasticizer added to a mixture of one of the lithium salt solutions and polyacryinitrile.

Carbonaceous Negative Electrode

It is possible to use a synthetic graphite, a natural graphite, a mesophase low temperature calcination carbon, a graphite carbin fiber, a thermal expansion carbon (gaseous phase growing carbon), or an amorphous hard carbon. The amorphous hard carbon utilizes as a raw material furfuryl resin, phenol resin, petrol pitch bridged by oxygen, heavy oil, or naphthalene.

Positive Electrode

For the positive electrode of the lithium secondary battery of the present invention, it is possible to use a transition metal oxide, a metal chalcogenide compound, or a metal halide. For the transition metal, it is preferable to use cobalt, nickel, manganese, iron, chrome, titanium, vanadium, or molybdenum; and for the compound it is preferable to use $LiCoO_2$, $LiMnO_2$, $LiNiO_2$, $LiNi_{1-x}Co_xO_2$, or $LiNi_{1-x-y}Co_xM_yO_2$ (where M is a trihydric metal or a transition metal).

Silane Process Solution

In the present invention, it is preferable to use a silane coupling agent for the silane process solution. An extremely thin film is realized with the silane coupling agent. For example, it is possible to obtain a mesoporous silica film of 2–50 nm using the silane coupling agent. R—$SiX_3$ is typically used as the silane coupling agent. R is a vinyl group, amino group, epoxy group, mercapto group, or alkyl group; and X is a methoxy group, ethoxy group, or a methoxyethoxy group.

The present invention is further explained in more detail with reference to the following examples. The invention can be utilized in various ways and is not intended to be confined to the examples.

EXAMPLE 1

A wet method is used for this process 2 g of a silane coupling agent of γ-aminopropyltriethoxysilane made by Shinesty Chemicals (KBE903) was dissolved in 50 ml of a water-ethanol solution at approximately a 1:1 ratio, and mixed well. Next, 5 g of hard carbon made by Mitsubishi Gas Chemicals was added to the mixture, and a resulting mixture was reacted while being stirred at 80° C. until none of the water-ethanol solution was left remaining.

After the reaction, the mixture was fully washed using ethanol then vacuum desiccated at 100° C., thereby producing a powder. The powder was then added to 50 ml of nitric acid of a 60% concentration, after which a resulting mixture underwent an oxidation process for 5 hours at a temperature of 70° C. to produce a carbon powder. Subsequently, the carbon powder was filtered then washed with water, after which the carbon powder was dried overnight. PVDF (polyvinylidenefluoride) of 10% by weight was then added to the powder and thoroughly mixed, after which N-methylpyrrolidine (NMP) of approximately five times the amount of the PVDF was added to the powder-PVDF mixture to produce a slurry.

The slurry was then coated on a copper foil having a thickness of 15 microns using a Doctor Blade method to obtain an electrode plate with a thickness approaching 100 microns. Next, a plurality of apertures of a predetermined size was formed in the electrode plate. Using this electrode plate, lithium metal as a counterpart electrode, a propylene carbonate/ethylene carbonate solution containing 1moll of $LiPF_6$ as electrolyte, and a polypropylene separator from Hexit Celanease (Celgard), a lithium secondary battery was produced. The lithium secondary battery was then charged/discharged in a range of 0–2V. A discharge capacity and an efficiency of a first cycle of the lithium secondary battery are shown in Table 1.

EXAMPLE 2

Except for using graphite from Doyo Carbon Co. instead of the hard carbon from Mitsubishi Gas Chemical Co, the same method as that used in Example 1 was used to produce a lithium secondary battery The lithium secondary battery was then charged/discharged in a range of 0–2V. A discharge capacity and an efficiency of a first cycle of the lithium secondary battery are shown in Table 1.

COMPARATIVE EXAMPLE 1

A wet method is used for this process. Except for using graphite which did not undergo the silane-silicate processing by use of the silane coupling agent and the nitric acid of Example 1, the same method as that used in Example 1 was used to produce a lithium secondary battery The lithium secondary battery was then charged/discharged in a range of 0–2V. A discharge capacity and an efficiency of a first cycle of the lithium secondary battery are shown in Table 1.

COMPARATIVE EXAMPLE 2

Except for using graphite which did not undergo the silane-silicate processing of Example 2, the same method as that used in Example 2 was used to produce a lithium secondary battery. The lithium secondary battery was then charged/discharged in a range of 0–2V. A discharge capacity and an efficiency of a first cycle of the lithium secondary battery are shown in Table 1.

COMPARATIVE EXAMPLE 3

Except for using hard carbon only having undergone the silane process using the silane coupling agent and not the silicate process using the nitric acid, the same method as that used in Example 1 was used to produce a lithium secondary battery. The lithium secondary battery was then charged/discharged in a range of 0–2V. A discharge capacity and an efficiency of a first cycle of the lithium secondary battery are shown in Table 1.

COMPARATIVE EXAMPLE 4

Except for using hard carbon only having undergone the silicate process using the nitric acid and not the silane process using the silane coupling agent, the same method as that used in Example 1 was used to produce a lithium secondary battery. The lithium secondary battery was then charged/discharged in a range of 0–2V. A discharge capacity and an efficiency of a first cycle of the lithium secondary battery are shown in Table 1.

TABLE 1

| | Discharge capacity (mAh/g) | First cycle efficiency (%) |
|---|---|---|
| Example 1 | 458 | 77.5 |
| Example 2 | 338 | 96.5 |
| Comparative Example 1 | 387 | 75.2 |
| Comparative Example 2 | 312 | 86.2 |
| Comparative Example 3 | 80 | 50 |
| Comparative Example 4 | 371 | 74.2 |

As is shown in Table 1, the lithium secondary battery using carbon material for the negative electrode in which the carbon has undergone a wet method silane-silicate process and an oxidation process to change properties of the carbon surface has significantly higher discharge capacity and first cycle efficiency levels than the lithium secondary battery using carbon that has not been improved in this manner.

EXAMPLE 3

A dry method is used for this process. Synthetic graphite from Juesty Graphite Co., 1.5% by weight based on the synthetic graphite of a silane coupling agent of γ-aminopropylethoxysilane made by Japan Unica (A-1100), and 0.8% by weight based on the synthetic graphite of methanol water (methanol solution containing 10% by weight of water) were placed in a kneader, then stirred for 15 minutes at a temperature of 80° C. Next, the graphite was removed from the kneader, placed in a drying oven. then oxidized for 12 hours at 160° C. in an air atmosphere to produce a graphite powder.

Following the above, PVDF (polyvinylidenefluoride) of 10% by weight was then added to the powder and thoroughly mixed, after which N-methylpyrrolidine (NMP) of approximately five times the amount of the PVDF was added to the powder-PVDF mixture to produce a slurry. The slurry was then coated on a copper foil having a thickness of 15 microns using a Doctor Blade method to obtain an electrode plate with a thickness approaching 100 microns. Next, a plurality of apertures of a predetermined size was formed in the electrode plate.

Using this electrode plate, lithium metal as a counterpart electrode, a propylene carbonate/ethylene carbonate solution containing 1 mol/l of $LiPF_6$ as electrolyte, and a polypropylene separator from Hexit-Celanease (Celgard), a lithium secondary battery was produced. The lithium secondary battery was then charged/discharged in a range of 0–2V. A discharge capacity and an efficiency of a first cycle of the lithium secondary battery are shown in Table 2.

EXAMPLE 4

Except for performing oxidation for 4 hours at 3000° C., rather than for 12 hours at 160° C., the same method as that used in Example 3 was used to produce a lithium secondary battery. The lithium secondary battery was then charged/discharged in a range of 0–2V. A discharge capacity and an efficiency of a first cycle of the lithium secondary battery are shown in Table 2.

EXAMPLE 5

Except for performing oxidation in a nitrogen atmosphere for 12 hours at 600° C., the same method as that used in Example 3 was used to produce a lithium secondary battery. The lithium secondary battery was then charged/discharged in a range of 0–2V. A discharge capacity and an efficiency of a first cycle of the lithium secondary battery are shown in Table 2.

COMPARATIVE EXAMPLE 5

Except for excluding the dry method silane-silicate process, the same method as that used in Example 3 was used to produce a lithium secondary battery. The lithium secondary battery was then charged/discharged in a range of 0–2V. A discharge capacity and an efficiency of a first cycle of the lithium secondary battery are shown in Table 2.

COMPARATIVE EXAMPLE 6

Except for excluding the oxidation process, the same method as that used in Example 3 was used to produce a lithium secondary battery. The lithium secondary battery was then charged/discharged in a range of 0–2V. A discharge capacity and an efficiency of a first cycle of the lithium secondary battery are shown in Table 2.

TABLE 2

| | Discharge Capacity (mAh/g) | First cycle efficiency (%) |
|---|---|---|
| Example 3 | 345 | 95.2 |
| Example 4 | 334 | 94.0 |
| Example 5 | 336 | 93.5 |
| Comparative Example 5 | 336 | 89.5 |
| Comparative Example 6 | 326 | 90.6 |

As shown in Table 2 above, the lithium secondary battery using carbon material for the negative electrode in which the carbon has undergone a wet method silane-silicate process and a high temperature oxidation process to change properties of the carbon surface has higher discharge capacity and first cycle efficiency levels than the lithium secondary battery using carbon that has not been improved in this manner.

Figure 2:
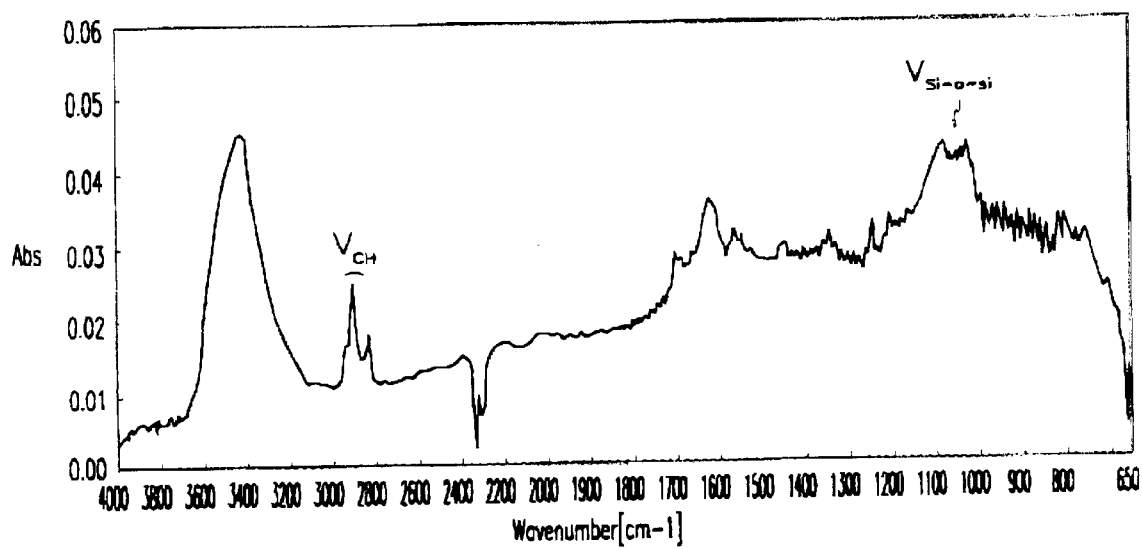
FIG. 2 is a graph of a FTIR spectrochemical analysis of Example 5 according to the present invention.
Figure 3:
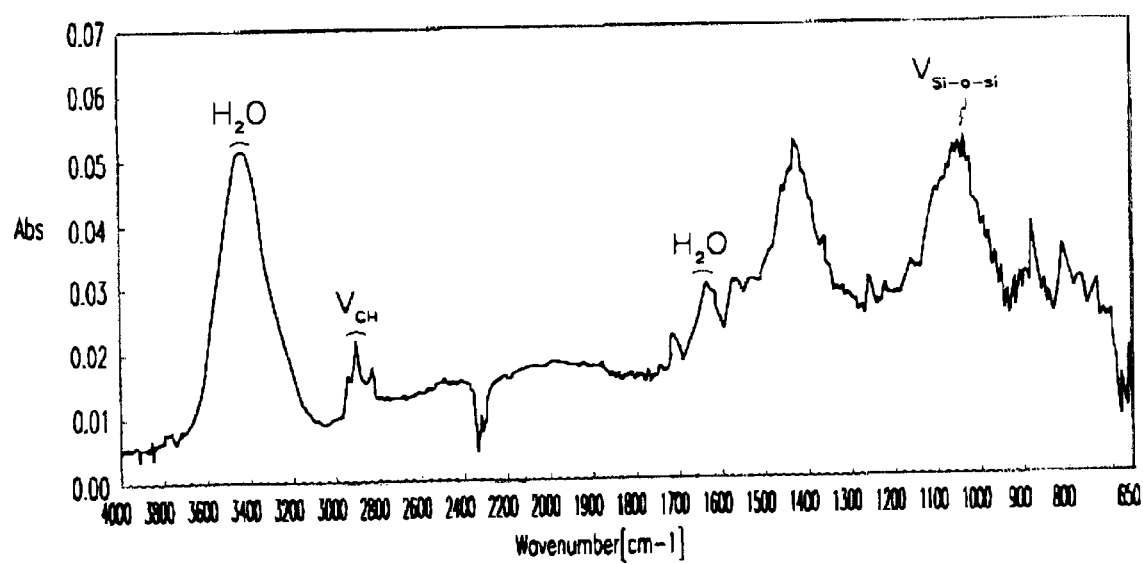
FIG. 3 is a graph of a FTIR spectrochemical analysis of Example 4 according to the present invention.

Referring to FIGS. 1–3, there are shown results of FTIR spectrochemical analyses for Comparative Example 6, and Examples 3 and 4. As shown in the drawings, an increase in chain-shaped SiO (shown by the arrows in the drawings) increases more in Examples 3 and 4 than in Comparative Example 6.

Although the present invention has been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A carbonaceous material for a negative electrode of a lithium secondary battery, the carbonaceous material comprising:

carbon particles; and a silica film coated on a surface of the carbon particles of the carbonaceous material, thereby minimizing both direct contact of the carbon particles with an organic electrolyte and cointercalation of the organic electrolyte and lithium ions within a structure of the carbon, wherein the silica film is formed by performing a silane process in the surface of the carbon particles using a silane coupling agent, after the silane process, a silicate process or a high temperature oxidation process is performed on the surface of the carbon particles.

2. The carbonaceous material of claim 1, wherein the high temperature oxidation process is performed at a temperature between 100 and 400° C. in a normal air atmosphere, or between 400 and 1000° C. in a nitrogen or argon atmosphere.

3. A lithium secondary battery comprising a negative electrode prepared by the carbonaceous material of claims 1 or 2.

* * * * *

UNITED STATES PATENT AND TRADEMARK OFFICE
CERTIFICATE OF CORRECTION

PATENT NO. : 6,218,050 B1
DATED : April 17, 2001
INVENTOR(S) : Yoon et al.

It is certified that error appears in the above-identified patent and that said Letters Patent is hereby corrected as shown below:

Title page,
Item [54], please delete "CABONACEOUS" and insert -- CARBONACEOUS --.

Signed and Sealed this

Twenty-sixth Day of February, 2002

Attest:

JAMES E. ROGAN
*Attesting Officer*    *Director of the United States Patent and Trademark Office*